United States Patent
Ohta et al.

(10) Patent No.: US 10,372,393 B2
(45) Date of Patent: Aug. 6, 2019

(54) PRINTING INFORMATION MANAGEMENT DEVICE AND PRINTING SYSTEM INCLUDING THE SAME

(71) Applicant: Roland DG Corporation, Hamamatsu-shi, Shizuoka (JP)

(72) Inventors: Takeomi Ohta, Hamamatsu (JP); Kazutoshi Funakoshi, Hamamatsu (JP); Takeshi Tozuka, Hamamatsu (JP); Hiroki Horiuchi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 16/022,801

(22) Filed: Jun. 29, 2018

(65) Prior Publication Data

US 2019/0004757 A1  Jan. 3, 2019

(30) Foreign Application Priority Data

Jun. 30, 2017  (JP) ................. 2017-128884

(51) Int. Cl.
*G06F 3/12* (2006.01)
(52) U.S. Cl.
CPC .......... *G06F 3/1257* (2013.01); *G06F 3/1204* (2013.01); *G06F 3/1282* (2013.01)
(58) Field of Classification Search
USPC ....................................... 358/1.14
See application file for complete search history.

(56) References Cited

U.S. PATENT DOCUMENTS

| 2007/0036588 | A1* | 2/2007 | Momose | G06F 3/1205 399/182 |
| 2009/0213161 | A1* | 8/2009 | Murai | H04N 1/54 347/15 |
| 2010/0067036 | A1* | 3/2010 | Oka | G06Q 10/00 358/1.14 |
| 2011/0242176 | A1* | 10/2011 | Iritani | B41J 2/2114 347/15 |

FOREIGN PATENT DOCUMENTS

| JP | 09-99607 A | 4/1997 |
| JP | 2009-230738 A | 10/2009 |
| JP | 2010-072935 A | 4/2010 |
| JP | 2011-218564 A | 11/2011 |
| WO | 2004/102373 A1 | 11/2004 |

* cited by examiner

*Primary Examiner* — Neil R McLean
*Assistant Examiner* — Darryl V Dottin
(74) *Attorney, Agent, or Firm* — Keating & Bennett, LLP

(57) ABSTRACT

A printing information management device includes a model storage that stores a plurality of product models each included in one file linked with information on a printing target and printing setting information used to control a recording device, a model selector that selects one product model from the plurality of product models, and an output that provides the printing setting information included in the selected product model to the recording device.

18 Claims, 9 Drawing Sheets

FIG.10

| Product model | | | File 1 | File 2 | File 3 | File 4 | File 5 |
|---|---|---|---|---|---|---|---|
| File name | | | SmartphoneA_White_High | SmartphoneA_White_Normal | SmartphoneA_Black | SmartphoneB_Purple_High | SmartphoneB_Purple_Normal |
| 1. Information on the printing target | | | | | | | |
| Name | Type | | SmartphoneA_White | SmartphoneA_White | SmartphoneA_Black | SmartphoneB_Purple | SmartphoneB_Purple |
| | Code | | RDG-0001 | RDG-0001 | RDG-0002 | RDG-0005 | RDG-0005 |
| Appearance | Material | | PVC resin | PVC resin | PVC resin | Leather | Leather |
| | Surface glossiness | | Glossy | Not glossy | Glossy | Not glossy | Not glossy |
| | Color | | White | White | Black | Purple | Purple |
| Size | ①Base Size X (mm) | | 78 | 78 | 78 | 72 | 72 |
| | ②Base Size Y (mm) | | 158 | 158 | 158 | 146 | 146 |
| | ③Round Size x (mm) | | 5 | 5 | 5 | 0 | 0 |
| | ④Round Size y (mm) | | 5 | 5 | 5 | 0 | 0 |
| 2. Printing setting information | | | | | | | |
| Quality | High/standard | | High quality | Standard | Standard | High quality | Standard |
| Type of ink | Primer ink | | OFF | OFF | OFF | ON | ON |
| | White ink | | OFF | OFF | ON | ON | OFF |
| | Coating ink (glossy finish) | | ON | OFF | ON | OFF | OFF |
| | Coating ink (matte finish) | | OFF | OFF | OFF | ON | ON |
| Surface | Rear surface | | OFF | OFF | OFF | OFF | OFF |
| Printing region | ⑤Print Size X (mm) | | 70 | 70 | 70 | 62 | 62 |
| | ⑥Print Size Y (mm) | | 150 | 150 | 150 | 136 | 136 |
| | ⑦Offset x (mm) | | 4 | 4 | 4 | 5 | 5 |
| | ⑧Offset y (mm) | | 4 | 4 | 4 | 5 | 5 |
| Printing pattern | Printing process | 1st | CMYK Gcoat | CMYK | White-CMYK Gcoat | Primer White-CMYK Mcoat | Primer CMYK-Mcoat |
| | | 2nd | | | | | |
| | | 3rd | | | | | |
| Printing time | Number of printing processes | | 2 | 1 | 2 | 3 | 2 |
| 3. Printing cost | (relative value) | | 100 | 50 | 100 | 150 | 110 |
| 4. Type of palette | | | | | | | |
| Default palette | | | SmartphoneA_JIG | SmartphoneA_JIG | SmartphoneA_JIG | SmartphoneB_JIG | SmartphoneB_JIG |
| List of usable palettes | | | SmartphoneA_JIG SmartphoneA_JIG_02 SmartphoneA_JIG_03 | SmartphoneA_JIG SmartphoneA_JIG_02 SmartphoneA_JIG_03 | SmartphoneA_JIG SmartphoneA_JIG_02 SmartphoneA_JIG_03 | SmartphoneB_JIG SmartphoneB_JIG_02 | SmartphoneB_JIG SmartphoneB_JIG_02 | ns
PRINTING INFORMATION MANAGEMENT DEVICE AND PRINTING SYSTEM INCLUDING THE SAME

CROSS REFERENCE TO RELATED APPLICATIONS

This application claims the benefit of priority to Japanese Patent Application No. 2017-128884 filed on Jun. 30, 2017. The entire contents of this application are hereby incorporated herein by reference.

BACKGROUND OF THE INVENTION

1. Field of the Invention

The present invention relates to a printing information management device and a printing system including the same.

2. Description of the Related Art

Conventionally, a recording device performing overlapping printing on a printing target by use of process color ink and special color for the purpose of improving the quality of a printed item and the quality of design of the printed item is known (e.g., Japanese Laid-Open Patent Publication No. 2009-230738).

For such a recording device, each time printing is to be performed, a user manually sets various settings including the size of the printing region, the type of ink to be used for the printing, the order of ink to be used for the overlapping printing, and the like. Therefore, when, for example, the type of the printing target or the setting for the printing is changed, the user needs to newly input the settings. This is a significant burden on the user. In addition, recently, installation of such a recording device in, for example, a retail store or the like has been spreading rapidly. In such a situation, a user not skilled in handling the recording device often uses the recording device. In the case where such a user makes a printing setting, it may take a long time to input a setting or the user may input an inappropriate setting by mistake. This may decrease the printing efficiency, the printing may be made at a position shifted from an intended position, or the printing quality may be varied. In such a case, a printed item as expected is not provided.

SUMMARY OF THE INVENTION

Preferred embodiments of the present invention provide printing information management devices realizing an appropriate printing setting in a simple manner, and printing systems including the same.

A preferred embodiment according to the present invention provides a printing information management device managing a product model usable for a recording device including ink heads ejecting a plurality of types of ink, a support that supports a printing target, and a moving device moving the support in a scanning direction with respect to the ink heads. The printing information management device includes a model storage having stored thereon a plurality of product models each included in one file in a state of being linked with information on the printing target and printing setting information necessary to control the recording device; a model selector that selects one product model from the plurality of product models; and an output that provides the printing setting information included in the selected product model to the recording device.

With the printing information management device, printing information necessary for printing is preset in product models. The user merely needs to select a product model in accordance with, for example, the type of the printing target to make a necessary printing setting. Therefore, even when a user having little knowledge or experience in printing uses the recording device, a printing setting may be made easily and quickly. In addition, as compared with the case where the printing setting is manually input to the recording device, the printing fails less and a desired printed item is stably provided.

A printing system according to a preferred embodiment of the present invention includes the above-described printing information management device; and a recording device communicably connected with the printing information management device. With this printing system, it is not necessary to manually input the printing setting to the recording device each time printing is to be performed. Therefore, even a user having little knowledge or experience in printing may perform printing easily.

A non-transitory computer-readable storage medium stores a computer program according to a preferred embodiment of the present invention that causes a computer to operate as the above-described printing information management device.

According to preferred embodiments of the present invention, an appropriate printing setting is made on a recording device.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 shows an example of product models.

DETAILED DESCRIPTION OF THE PREFERRED EMBODIMENTS

Hereinafter, preferred embodiments of the present invention will be described with reference to the drawings. The preferred embodiments described below are not intended to specifically limit the present invention. Components and portions that have the same functions will bear the same reference signs, and overlapping descriptions will be omitted or simplified optionally.

Figure 1:
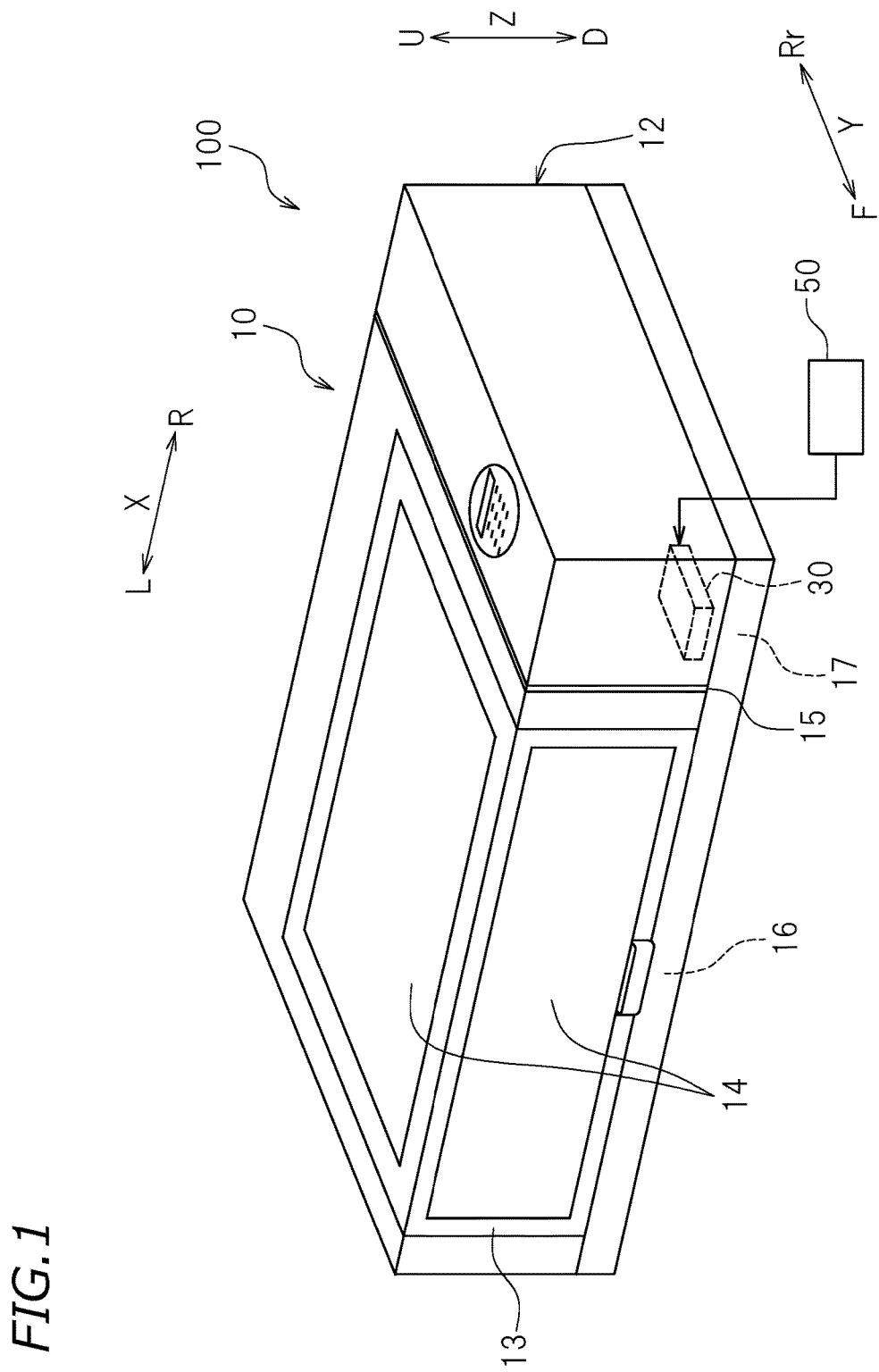
FIG. 1 is a perspective view of a printing system according to a preferred embodiment of the present invention.

FIG. 1 is a perspective view of a printing system 100. The printing system includes a recording device 10 and a printing information management device 50. The recording device 10 and the printing information management device 50 are communicably connected with each other in a wired or wireless manner. The printing information management device 50 manages a plurality of product models. The printing system 100 selects, from the plurality of product models managed by the printing information management device 50, a product model suitable to, for example, the type of a printing target 70 (see FIG. 5) or a demand of the user. A printing setting included in the product model is transmitted to the recording device 10, and printing is performed on the printing target 70.

In the following description, "left", "right", "up" and "down" are left, right, up and down as seen from a user facing a front surface of the recording device 10. A direction approaching the user from the recording device 10 is referred to as a "forward direction", and a direction distanced away from the user toward the recording device 10 is referred to as a "rearward direction". In the figures, letters F, Rr, L, R, U and D respectively refer to "front", "rear", "left", "right", "up" and "down". Letters X, Y and Z respectively refer to a "left-right direction", a "front-rear direction", and an "up-down direction". These directions are merely defined for the sake of convenience, and do not limit the manner of installation of the recording device 10.

Figure 2:
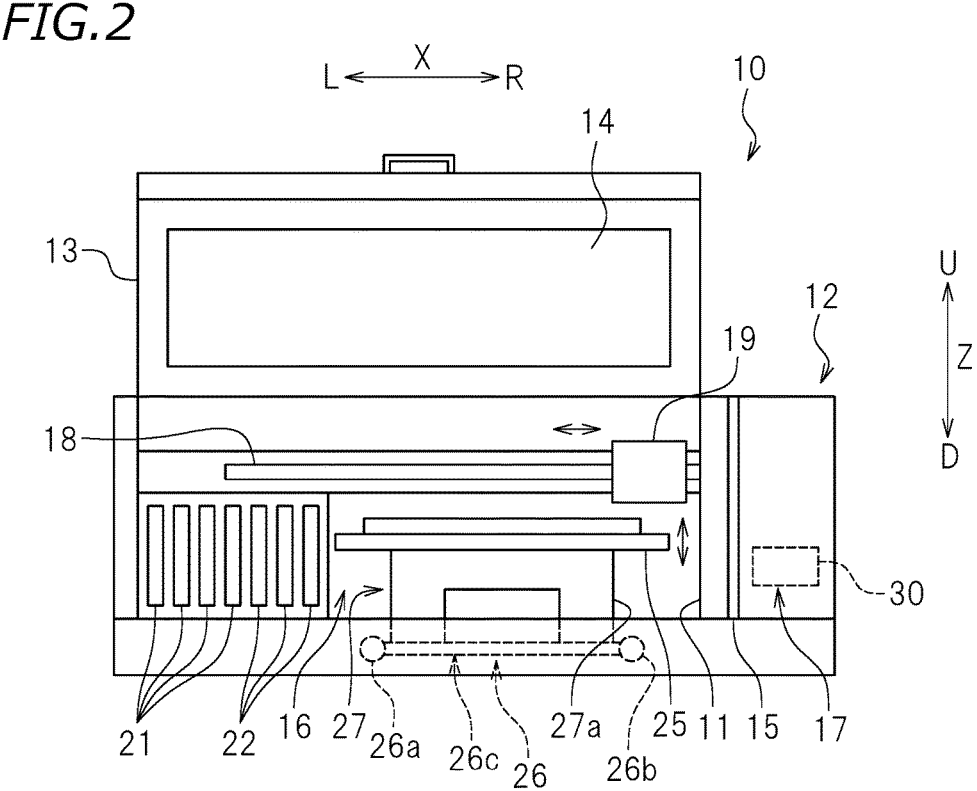
FIG. 2 is a front view of a recording device according to a preferred embodiment of the present invention.
Figure 3:
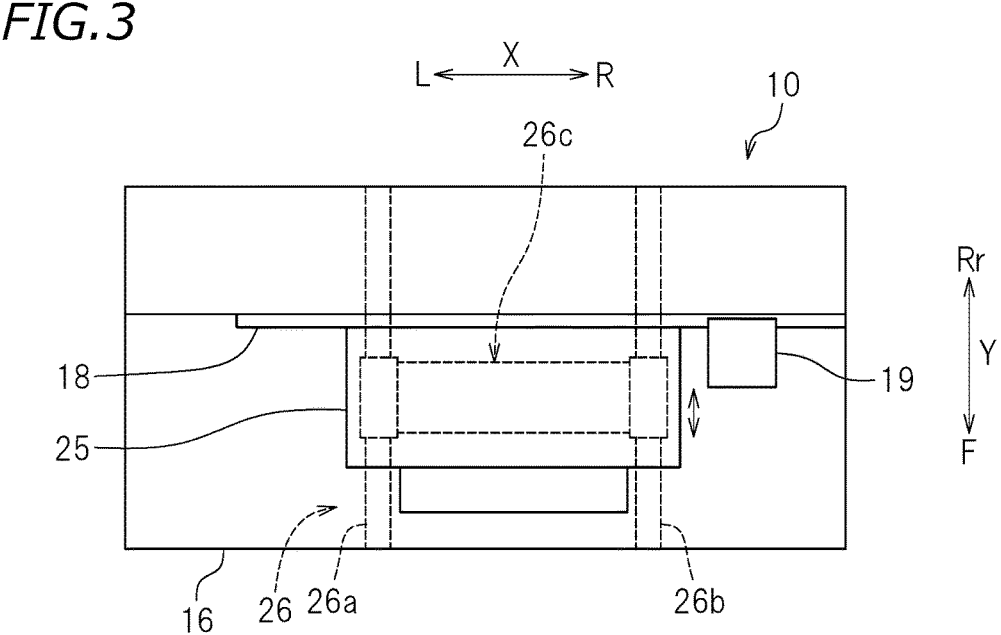
FIG. 3 is a plan view of a printing area according to a preferred embodiment of the present invention.

FIG. 2 is a front view of the recording device 10. FIG. 3 is a plan view of a printing area 16 of the recording device 10. The recording device 10 is an inkjet printer, for example, (hereinafter, referred to simply as a "printer") performing the printing on the printing target 70. In this specification, the term "inkjet printer" refers to a printer in general that uses a printing method realized by a conventionally known inkjet technology, for example, a continuous system such as a binary deflection system a continuous deflection system or the like; a thermal system; or any of various on-demand systems such as a piezoelectric element system or the like.

The printing target 70 includes a front surface and a rear surface. The printing target 70 may be, for example, a planar sheet such as a transfer sheet or the like. Alternatively, the printing target 70 may be any of various cases such as a mobile phone case or the like; a compact electronic device such as an electronic cigarette or the like; a small item such as a key chain, a photo frame or the like; a daily-use item; a case for cosmetics; a three-dimensional item such as a fashion accessory or the like. The printing target 70 may be formed of paper such as plain paper, inkjet printing paper or the like; a resin such as polyvinylchloride, acrylic resin, polycarbonate, polystyrene, acrylonitrile-butadiene-styrene (ABS) copolymer or the like; a metal material such as aluminum, stainless steel or the like; carbon; pottery; ceramics; glass; rubber; leather; etc.

The printer 10 may be box-shaped, for example. The printer 10 includes a casing 12 provided with an opening 11, and a front cover 13 capable of opening or closing the opening 11. The front cover 13 is supported by the casing 12 so as to be rotatable about a rear end as a rotation axis. The front cover 13 is rotated upward about the rear end thereof as an axis and thus is opened, so that an inner space and an outer space of the casing are communicated with each other. The front cover 13 is provided with a window 14. The window 14 is made of a transparent material. A user may check the inner space of the casing 12 through the window 14 even in the state where the front cover 13 is closed.

The inner space of the casing 12 is divided by a partitioning member 15 into the printing area 16 and a control area 17. The printing area 16 is a space to the left of the partitioning member 15. The control area 17 is a space to the right of the partitioning member 15. The control area 17 accommodates a controller 30.

A guide rail 18 is located above the printing area 16. The guide rail 18 is secured to the casing 12, and extends in the left-right direction X. A carriage 19 is slidably provided on the guide rail 18. The carriage 19 is reciprocatingly movable in the left-right direction X along the guide rail 18 by a carriage moving mechanism (not shown). The carriage moving mechanism (not shown) includes a pair of pulleys (not shown) respectively located at a right end and a left end of the guide rail 18, and an endless belt (not shown) and a carriage motor (not shown). The carriage 19 is secured to the endless belt extended between, and wound along, the pair of pulleys. One of the pulleys is coupled with the carriage motor. The carriage motor is electrically connected with the controller 30, and is controlled by the controller 30. When the carriage motor is driven, the pulleys are rotated and thus the belt runs. As a result, the carriage 19 is moved in the left-right direction X along the guide rail 18.

Figure 4:
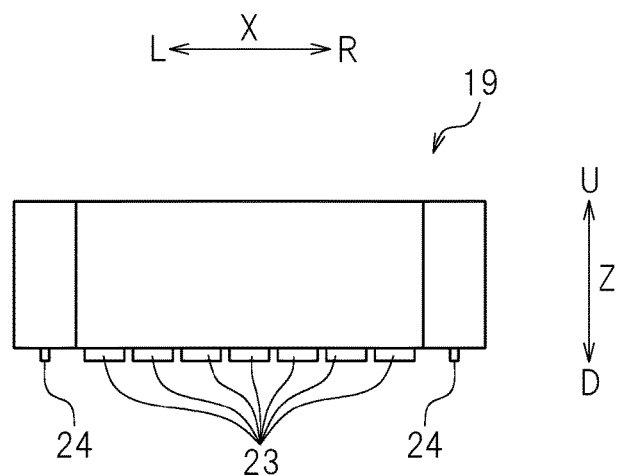
FIG. 4 is a partial enlarged view of a carriage according to a preferred embodiment of the present invention.

FIG. 4 is a partial enlarged view of the carriage 19. The carriage 19 includes seven ink heads 23 and two ultraviolet lamps 24, for example. The ink heads 23 are provided to eject a plurality of types of ink toward the printing target 70. The ink heads 23 are arrayed side by side in the left-right direction X and provided in an in-line array. The ink heads 23 are respectively communicated with ink cartridge 21 and 22 via flexible ink tubes (not shown).

The ink cartridges 21 and 22 store ultraviolet-curable ink. The ultraviolet-curable ink typically contains a polymerizable compound and a polymerization initiator. The ink cartridges 21 respectively store process color ink (CMYK) of cyan ink (C), magenta ink (M), yellow ink (Y) and black ink (K). The process color ink is usable to form an image. The ink cartridges 22 respectively store special color ink of primer ink (Pr), white ink (Wh) and coating ink (coat). The ink stored in the ink cartridges 22 is different in color, usage and the like from the process color ink stored in the ink cartridges 21. In this specification, the term "special color ink" refers to any ink that has a different color and/or properties from those of the process color ink. In this specification, the expression "plurality of types of ink" refers to any two or more types of ink selected from a plurality of colors of process color ink (CMYK) and a plurality of types of special color ink (Pr, Wh, coat, etc.). Specifically, the expression "plurality of types of ink" refers to a plurality of process color ink (CMYK) different in color and at least one type of special color ink.

The primer ink (Pr) is pre-processing ink used when, for example, the printing target 70 on which the printing is to be performed is highly ink-repelling, in order to allow ink to be well fixed to the printing target 70. The primer ink is used to form an underlying layer before the process color ink or the special color ink other than the primer ink is printed on the printing target 70. The primer ink is typically transparent. The white ink (Wh) is used to form an image and also is used when, for example, the printing target 70 is transparent or black, in order to form an underlying layer to allow the process color ink to better express a color thereof. The coating ink (coat) is used for surface processing. The coating ink is used to finish the surface after, for example, the process color ink or the white ink is used to form an image.

The coating ink is typically transparent. The coating ink may provide a lustrous glossy surface finish (Gcoat) or a lack-luster matte surface finish (Mcoat) in accordance with, for example, the number of times of ejection of the ink or the timing at which the ultraviolet lamps 24 direct light.

In this preferred embodiment, the printer 10 includes four ink cartridges 21 and three ink cartridges 22, for example. The number of the ink cartridges is not limited to the above. The ink cartridges 21 and 22 may be each provided in the number of one, two, three, four, or five or more. For example, the ink cartridges 22 do not need to include the ink cartridges storing the white ink and/or the primer ink and/or the coating ink.

The ultraviolet lamps 24 direct ultraviolet light toward the printing target 70 in order to cure the ink. One ultraviolet lamp 24 is located at a left end of the ink heads 23, and the other ultraviolet lamp 24 is located at a right end of the ink heads 23. The ultraviolet lamps 24 are arrayed side by side with the ink heads 23 in the left-right direction X. The ultraviolet lamps 24 direct light having an ultraviolet wavelength capable of curing the ink. The ultraviolet lamps 24 may be, for example, LEDs, fluorescent lamps (low pressure mercury lamps) or high pressure mercury lamps. In this example, two ultraviolet lamps 24 are provided. Alternatively, one ultraviolet lamp 24 or three or more ultraviolet lamps 24 may be provided. The ultraviolet lamps 24 may be mounted on a carriage different from the carriage including the ink heads 23. The ultraviolet lamps 24 may be provided on, for example, a wall of the casing 12.

The printer 10 is a so-called flatbed printer. Below the carriage 19, a table 25 is provided. The table 25 is an example of support. The table 25 supports the printing target 70.

Figure 5:
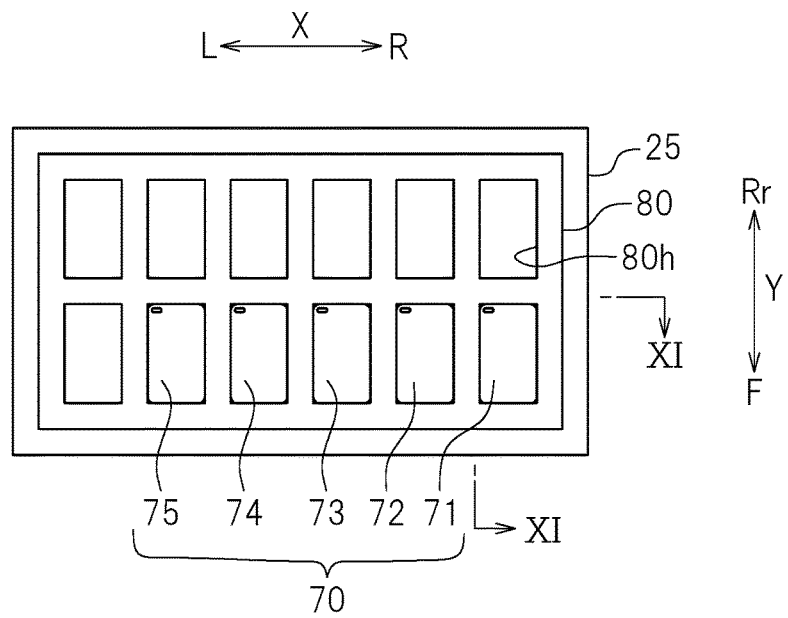
FIG. 5 is a plan view of a palette located on a table and accommodating a plurality of printing targets.

FIG. 5 is a plan view showing a palette 80 placed on the table 25. The palette 80 is a tool specifying the position of each of the printing targets 70. In the case where a plurality of printing targets 70 are subjected to printing at the same time, the palette 80 may accommodate the plurality of printing targets 70 to prevent the positions thereof from being shifted from each other. The palette 80 is a plate-shaped member. There is no specific limitation on the external shape of the palette 80. In this example, the palette 80 has the same shape as that of the table 25, and is rectangular or substantially as seen in a plan view, for example.

The palette 80 is provided with a plurality of location holes 80h having a shape corresponding to the external shape of the printing targets 70. In this example, the plurality of location holes 80h are of the same shape and the same size (processing error is permissible). The plurality of location holes 80h are arrayed side by side in the left-right direction X and the front-rear direction Y. There is no specific limitation on the number of the location holes 80h. In this example, six location holes 80h are arrayed in the left-right direction X and two location holes 80h are arrayed in the front-rear direction Y in the palette 80, for example. Twelve location holes 80h are provided in total, for example. There is no specific limitation on the shape of the location holes 80h. In this example, the location holes 80h are rectangular or substantially rectangular as seen in a plan view. Alternatively, the location holes 80h may be, for example, triangular, square, circular, star-shaped or the like. In this example, the location holes 80h are through-holes extending through the palette 80 in a height direction Z. Alternatively, the location holes 80h may be, for example, recessed portions formed by shaving a top portion of the palette 80, may be defined by frames protruding from the palette 80, or may be a line, pattern or the like drawn on a surface of the palette 80.

On the palette 80, five printing targets 71 through 75 of the same type and the same size are located as the plurality of printing targets 70, for example. In this example, the size and the shape of the printing targets 70 located in the location holes 80h are the same or substantially the same as those of the location holes 80h. Alternatively, the size of the printing targets 70 located in the location holes 80h may be smaller than that of the location holes 80h. The shape of the printing targets 70 located in the location holes 80h may be different from that of the location holes 80h.

The table 25 is movable in the front-rear direction Y by a first table moving mechanism 26. The table 25 is movable in the up-down direction Z by a second table moving mechanism 27. The first table moving mechanism 26 is an example of moving device that moves the table 25 in a scanning direction with respect to the ink heads 23.

The first table moving mechanism 26 includes slide rails 26a and 26b, a transportation member 26c, and a front-rear moving motor (not shown). The slide rails 26a and 26b extend in the front-rear direction Y. The slide rails 26a and 26b are parallel or substantially parallel to each other. The transportation member 26c is slidable with respect to the slide rails 26a and 26b. The table 25 is supported above the transportation member 26c via another member. The front-rear moving motor is electrically connected with the controller 30, and is controlled by the controller 30. When the front-rear moving motor is driven, the transportation member 26c moves along the slide rails 26a and 26b. As a result, the table 25 moves in the front-rear direction Y. In this preferred embodiment, one of two directions defined as the front-rear direction Y, namely, a direction from an upstream position to a downstream position in the direction in which the table 25 is transported, is the scanning direction.

The second table moving mechanism 27 includes a height adjusting member 27a and an up-down moving motor (not shown). The height adjusting member 27a is provided on a bottom surface of the table 25. The height adjusting member 27a is connected to the up-down moving motor. The up-down moving motor is electrically connected with the controller 30, and is controlled by the controller 30. When the up-down moving motor is driven, the height of the height adjusting member 27a is changed to adjust the level of the table 25.

The controller 30 provided in the control area 17 is configured or programmed to control an operation of each of components of the printer 10. The controller 30 is typically a computer. The controller 30 includes, for example, an interface (I/F) receiving printing setting information from the printing information management device 50, a central processing unit (CPU) executing a command of a control program or programs, a ROM (read only memory) having a program or programs executable by the CPU stored thereon, a RAM (random access memory) usable as a working area in which the program is developed, and a storage device such as a memory or the like that has the above-mentioned program or programs and various types of data stored thereon.

The controller 30 is communicably connected with the carriage motor of the carriage moving mechanism, the front-rear moving motor of the first table moving mechanism 26, and the up-down moving motor of the second table moving mechanism 27, and controls the positional relationship between the printing target and the ink heads 23. The controller 30 is communicably connected with the ink heads 23, and controls the ejection of the ink toward the printing target 70. The controller 30 is communicably connected with the ultraviolet lamps 24, and controls the ultraviolet lamps 24 to be started and stopped. When one printing process is finished, the controller 30 determines whether or not the printing pattern includes the next printing process. The controller 30 is configured or programmed to, in the case where the printing pattern includes the next printing process, drive the front-rear moving motor of the first table moving mechanism 26 to return the table 25 in one of the two direction defined as the front-rear direction Y up to the position where the immediately previous printing process was started.

The printing information management device 50 is configured or programmed to manage a plurality of product models. In this specification, the term "product model" refers to data stored in one file in the state of including information on the printing target 70 (e.g., type of the printing target 70) and at least printing setting information (e.g., information on a printing region or a printing pattern) necessary to control the printer 10 linked to the information on the printing target 70.

The printing information management device 50 is typically a computer, and includes, for example, a CPU, a ROM and a RAM. The printing information management device 50 may be, for example, a notebook personal computer, or a mobile terminal such as a tablet terminal, a smartphone or the like. In this example, the printing information management device 50 is an external device connected with the printer 10. Alternatively, the printing information management device may be built in the controller 30 of the printer 10.

The printing information management device 50 may be a computer program causing a CPU of a computer to operate as the printing information management device 50. Such a computer program may be provided in the form of a non-transitory computer-readable storage medium that performs an operation of the printing information management device 50 when executed by a computer. Examples of the storage medium include a semiconductor storage medium (e.g., ROM, non-volatile memory card), an optical storage medium (e.g., DVD, MO, MD, CD, BD), a magnetic storage medium (e.g., magnetic tape, flexible disc) and the like. The computer program may be transmitted to a server computer via the above-described storage medium or a network such as the Internet or the like. In this case, the server computer is one preferred embodiment of the present invention disclosed herein.

Figure 6:
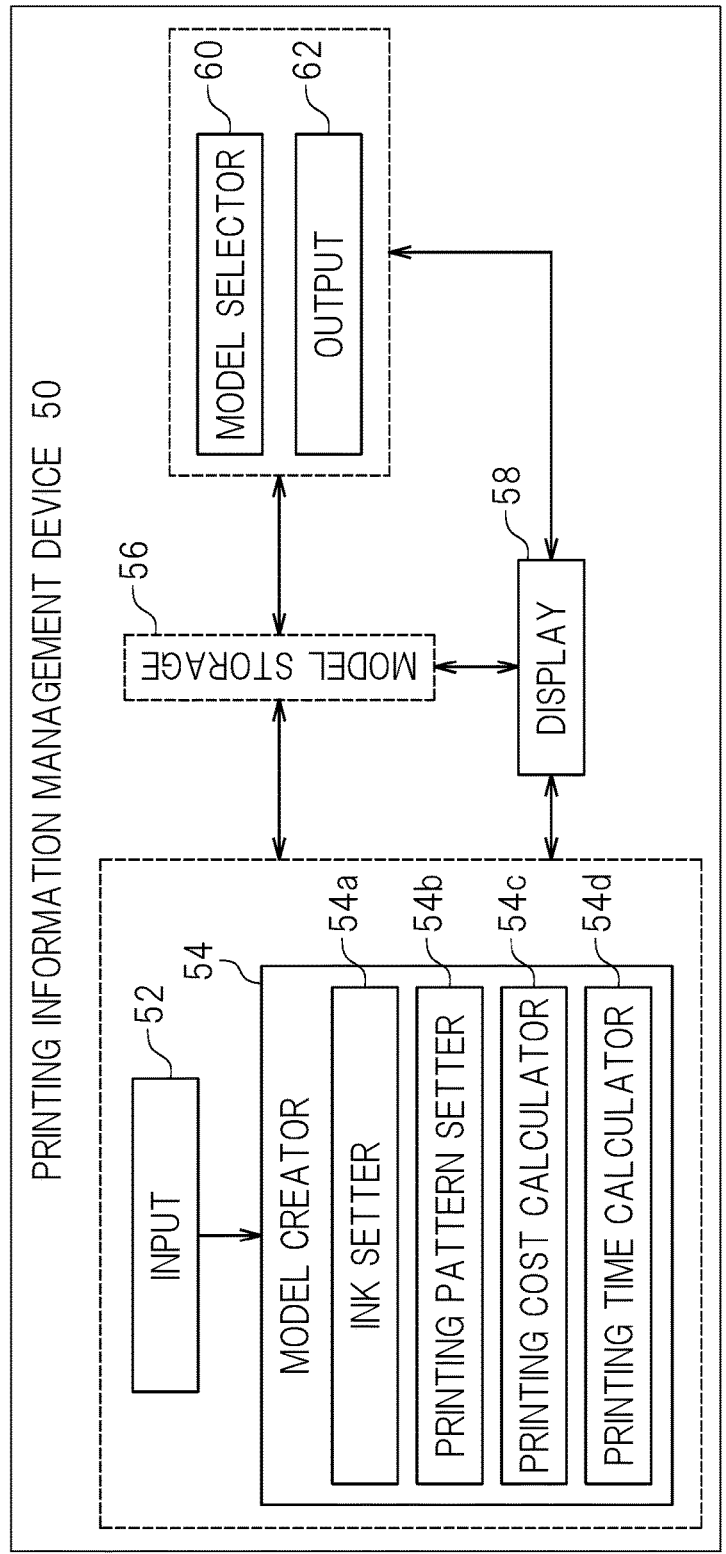
FIG. 6 is a block diagram showing a structure of a printing information management device according to a preferred embodiment of the present invention.

FIG. 6 is a block diagram showing a structure of the printing information management device 50. The printing information management device 50 includes, for example, an input 52, a model creator 54, a model storage 56, a display 58, a model selector 60, and an output 62. The input 52 and the model creator 54 are regions usable to create a new product model. The model storage 56 is a region that stores a plurality of product models. The display 58, the model selector 60 and the output 62 are regions usable to perform the printing on the printing target 70. Each of such components of the printing information management device 50 is mutually communicable. Each of the components of the printing information management device 50 may be realized by software or hardware. Each of the components of the printing information management device 50 may be provided by one or a plurality of processors or may be incorporated into a circuit.

Information on the printing target 70 and printing setting information are provided to the input 52 by the user. Examples of the information on the printing target 70 to be provided to the input 52 include the type and the name of the printing target 70, the size of the printing target 70, and information on an external appearance of the printing target 70 such as the color, the material and the glossiness of a surface thereof, and the like. The information on the printing target 70 varies in accordance with the type of the printing target 70, the sense of values of the user, or the like, and is diversified, and thus is not limited to the above. Examples of the printing setting information to be input to the input 52 include information on the image to be printed, information on the type of ink to be used, information on the surface of the printing target 70 on which the printing is to be performed, information on the size of the printing region, information on a printing origin predefined as the origin that defines the position coordinate during the printing, position information on the printing start point defined on the basis of the printing origin (offset information), and the like. The printing setting information may vary in accordance with, for example, the type or the model of the printer 10, and thus is not limited to the above. In addition to the above-described information, information on, for example, the palette 80 usable to perform the printing on the printing target 70, more specifically, information on the type(s) of one or a plurality of palettes 80 provided with the location holes 80h capable of accommodating the printing targets 70, may be input to the input 52. The information on the palettes 80 is linked with the information on the printing targets 70.

The input 52 typically includes an input device (not shown) such as a keyboard, a mouse, a button or the like, and is configured or programmed such that the user may manually input the above-described information thereto. Alternatively, the input 52 may be configured or programmed to acquire such information from an external device such as a host computer or the like or from a network connected with the input 52 in a wired of wireless manner. The information input to the input 52 is transmitted to the model creator 54 or the model storage 56.

The model creator 54 is configured or programmed to create a product model based on the information input to the input 52. The model creator 54 is configured or programmed to include, for example, an ink setter 54a, a printing pattern setter 54b, a printing cost calculator 54c, and a printing time calculator 54d. The ink setter 54a is configured or programmed to determine the type of ink to be used for the printing. The printing pattern setter 54b is configured or programmed to set a printing pattern usable to control the controller 30 of the printer 10. The printing cost calculator 54c is configured or programmed to calculate the cost for the printing. The printing time calculator 54d is configured or programmed to calculate an approximate printing time required for the printing. The product model created by the model creator 54 is registered and stored on the model storage 56 as one file. Hereinafter, a procedure of creating a product model will be described.

Figure 7:
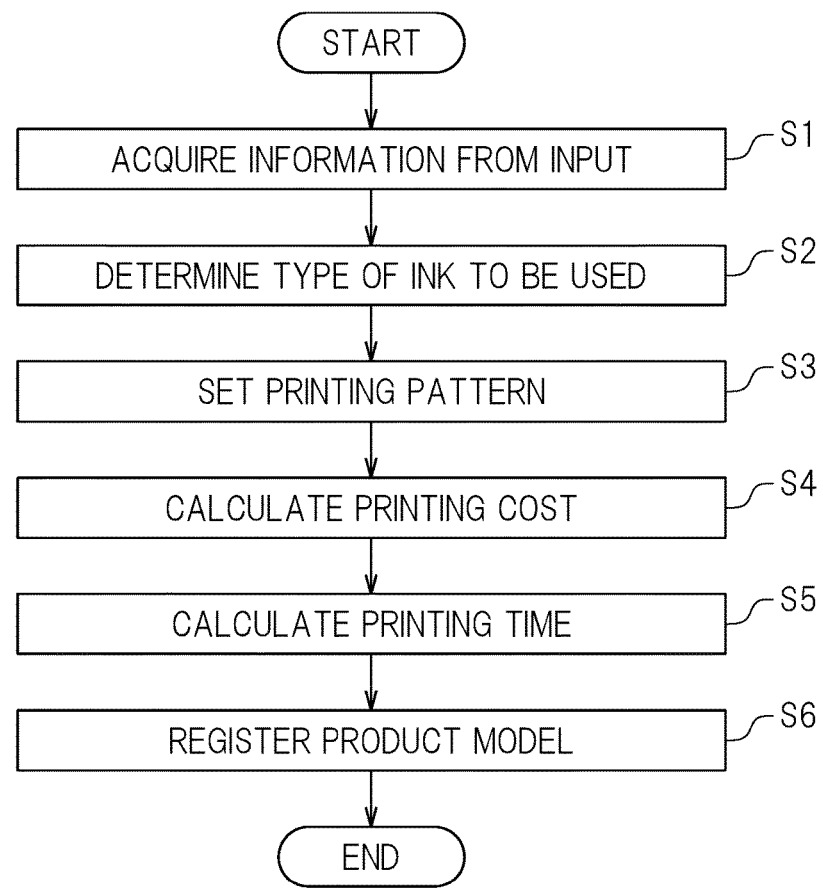
FIG. 7 shows an example of flowchart showing a procedure of creating a product model.

FIG. 7 shows an example of flowchart showing a procedure of the model creator 54 creating a product model. In this preferred embodiment, first, in step S1, the information on the printing target 70 input by the user, for example, information on the color, the material, the glossiness of a surface and the like of the printing target 70, and information on the surface of the printing target 70 on which the printing is to be performed, are transmitted from the input 52 to the ink setter 54a of the model creator 54.

Next, in step S2, the ink setter 54a determines the type of ink to be used for the printing. Information on the type of ink determined in this step may include, for example, whether or not there is an underlying layer formed with the primer ink or the white ink, and whether or not a glossy or matte surface finish is to be provided by use of the coating ink. In one preferred embodiment, in the case where the image to be printed is a color image (encompassing a black or gray image), the ink setter 54a determines to use the process color ink. In the case where the image to be printed is a white or transparent image, the ink setter 54a determines not to use the process color ink.

In another preferred embodiment, the ink setter 54a determines the type of special color ink to be used in accordance with the color of the printing target 70. In the case where, for example, the printing target 70 is transparent or of a dark color (black, navy blue, brown, etc.), the ink setter 54a determines to use the white ink. In the case where, for example, the printing target 70 is white or of a pale color, the ink setter 54a determines not to use the white ink.

In still another preferred embodiment, the ink setter 54a determines the type of special color ink to be used in accordance with the material of the printing target 70. In the case where, for example, the printing target 70 is made of a highly ink-repelling material such as leather, glass or the like, the ink setter 54a determines to use the primer ink. In the case where, for example, the printing target 70 is formed of a material having a high affinity to ink, such as a resin, carbon or the like, the ink setter 54a determines not to use the primer ink.

In still another preferred embodiment, the ink setter 54a determines the type of special color ink to be used in accordance with the level of glossiness of the surface of the printing target 70. In the case where, for example, the surface of the printing target 70 is glossy, the ink setter 54a determines to use the coating ink to provide a glossy surface finish. In the case where, for example, the surface of the printing target 70 is not glossy, the ink setter 54a determines to use the coating ink to provide a matte surface finish.

The type of ink determined by the ink setter 54a is linked with the information input to the input 52 and provisionally stored on the model storage 56 as one work file. In this example, the type of ink to be used is determined based on the information on the printing target 70. Alternatively, for example, the user may arbitrarily select the type of ink to be used and directly input the type to the input 52 as printing setting information, needless to say. In this case, in step S1, the information on the type of ink input by the user is transmitted to the ink setter 54a.

In this step, for one printing target 70, the ink setter 54a may provisionally store, on the model storage 56, a plurality of work files of different types of ink to be used. Such a plurality of work files of different types of ink to be used may be recognized as variation files that are different in at least one of the printing quality, the printing cost and the printing time. In the case where, for example, the printing target 70 is transparent or of a dark color, the ink setter 54a may provisionally store, on the model storage 56, a work file of a high quality type of using the white ink and a work file of a standard type of not using the white ink. In the case where, for example, the surface of the printing target 70 is glossy, the ink setter 54a may provisionally store, on the model storage 56, a work file of a high quality type of using the coating ink and a work file of a standard type of not using the coating ink. The "high quality type" indicates that higher quality printing is possible than the standard type. The high quality type, for example, uses a larger number of types of ink, and therefore, typically costs higher than the standard type.

Next, in step S3, the printing pattern setter 54b sets a printing pattern based on, for example, the information input to the input 52 on the surface of the printing target 70 on which the printing is to be performed, and the type of ink to be used for the printing that is determined in step S2. In this specification, the "printing pattern" includes one or at least two printing processes, each including a repetition of ejection of ink from each of the ink heads 23 and movement of the table 25 in the scanning direction with respect to the ink heads 23, arranged in the order of execution. In this preferred embodiment, the "printing pattern" includes one or at least two printing process, each including a repetition of reciprocating movement of the carriage 19 along the guide rail 18, ejection of the ink from each of the ink heads 23 and movement of the table 25 in the scanning direction with respect to the ink heads 23, arranged in the order of execution.

Figure 8:
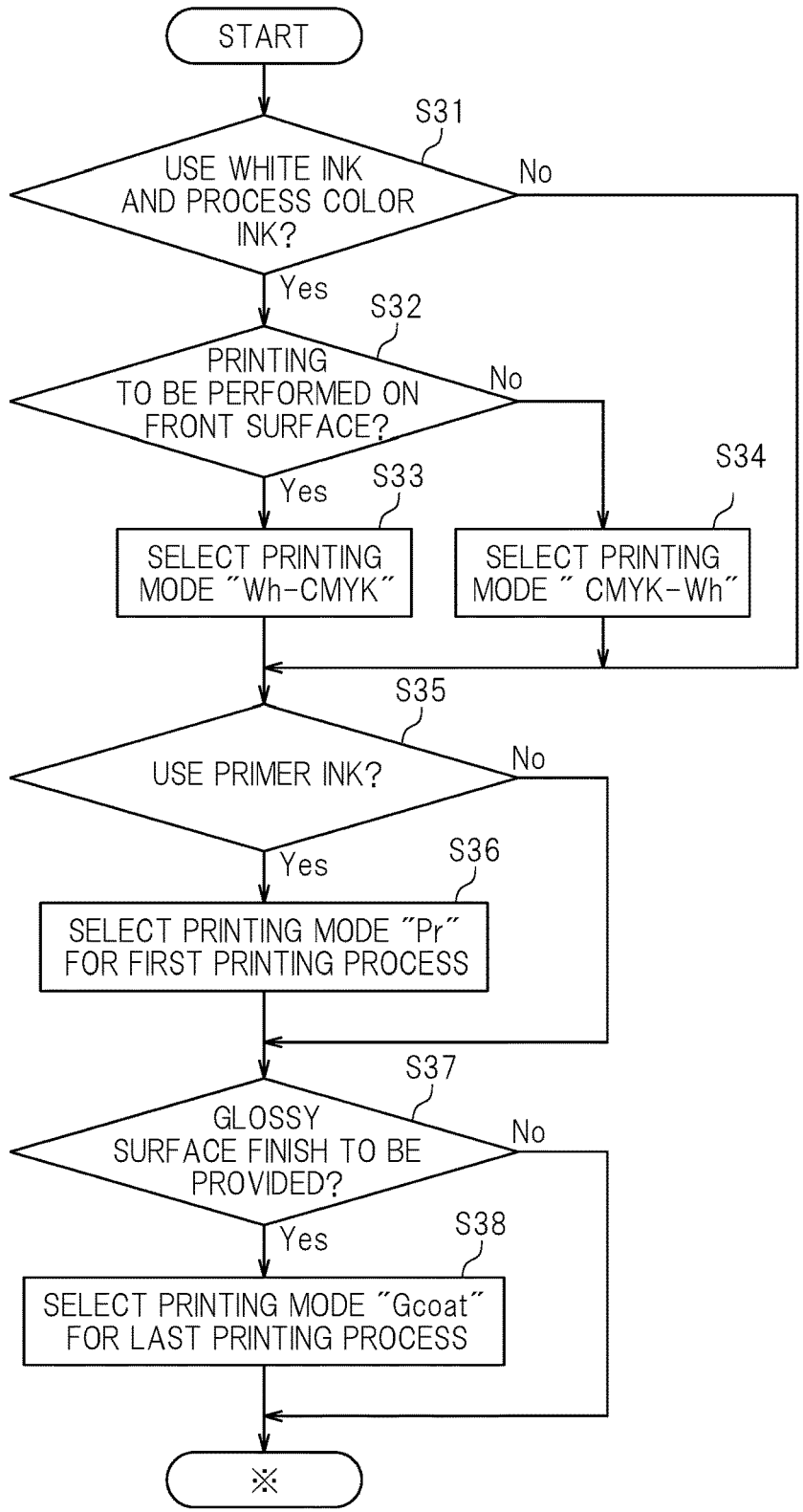
FIG. 8 shows an example of flowchart showing a first half of a procedure of setting a printing pattern.
Figure 9:
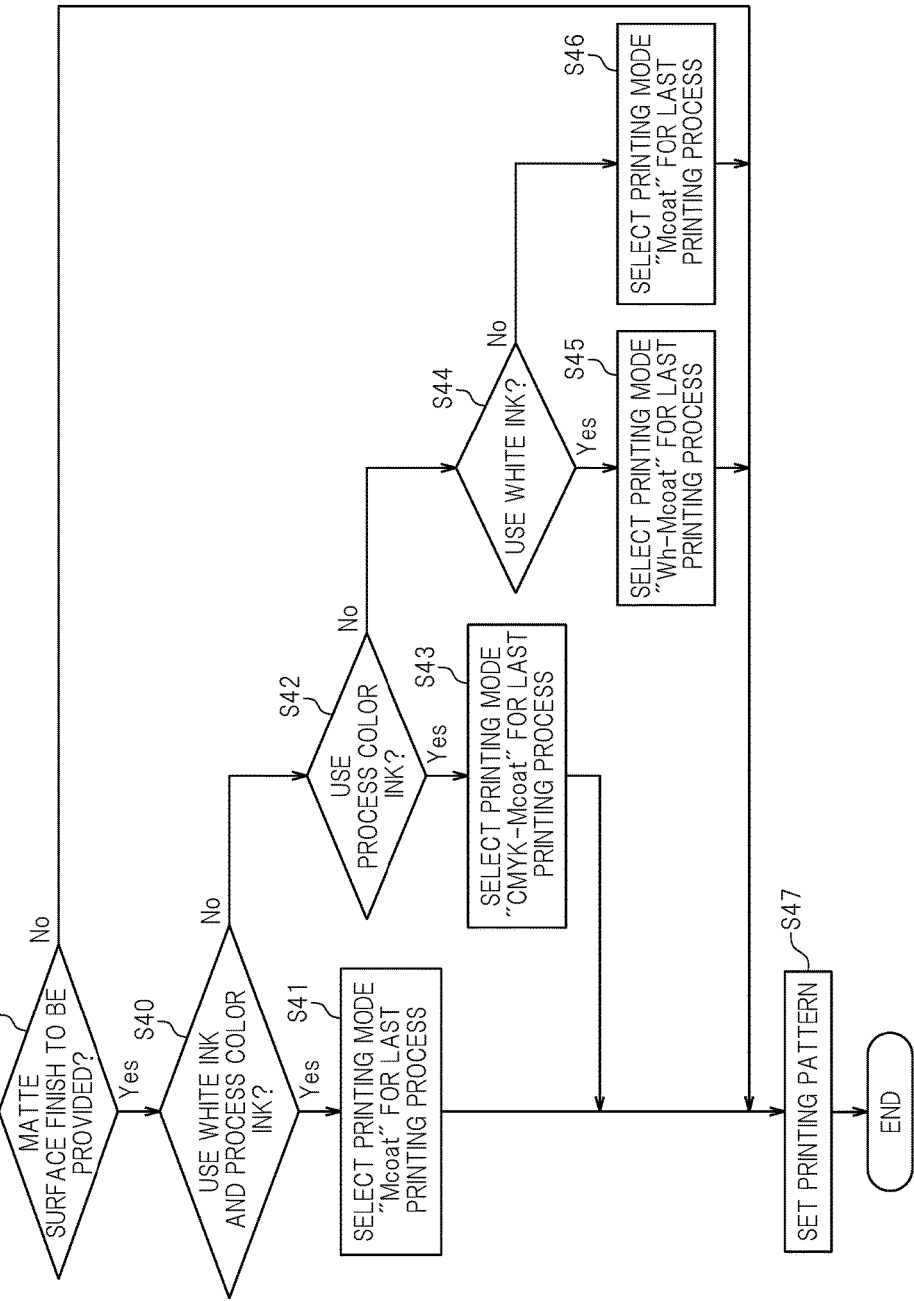
FIG. 9 shows an example of flowchart showing a second half of the procedure of setting the printing pattern.

FIG. 8 and FIG. 9 are each an example of flowchart showing a procedure of setting a printing pattern. In this preferred embodiment, first, in step S31, it is determined whether or not to use the white ink and the process color ink for the printing. In the case where the white ink and/or the process color ink is not to be used (No in step S31), the procedure advances to step S35. By contrast, in the case where the white ink and the process color ink are to be used (Yes in step S31), the procedure advances to step S32.

Next, in step S32, it is determined whether the surface on which the printing is to be performed is the front surface or the rear surface. In the case where the surface on which the printing is to be performed is the front surface (Yes in step S32), the procedure advances to step S33. In step S33, a printing mode (Wh-CMYK) of ejecting the white ink and the process color ink in this order in one printing process is selected, and the procedure advances to step S35. By contrast, in the case where the surface on which the printing is to be performed is not the front surface, in other words, is the rear surface (No in step S32), the procedure advances to step S34. In step S34, a printing mode (CMYK-Wh) of ejecting the process color ink and the white ink in this order in one printing process is selected, and the procedure advances to step S35.

Next, in step S35, it is determined whether or not to use the primer ink for the printing. In the case where the primer ink is not to be used (No in step S35), the procedure advances to step S37. By contrast, in the case where the primer ink is to be used (Yes in step S35), the procedure advances to step S36. In step S36, a printing mode (Pr) of ejecting only the primer ink in one printing process is selected. It is determined that the printing process of ejecting the primer ink is to be executed first among all the printing processes. Then, the procedure advances to step S37.

Next, in step S37, it is determined whether or not to provide a glossy surface finish by use of the coating ink. In the case where a glossy surface finish is not to be provided (No in step S37), the procedure advances to step S39. By contrast, in the case where a glossy surface finish is to be provided (Yes in step S37), the procedure advances to step S38. In step S38, a printing mode (Gcoat) of ejecting only the coating ink in one printing process to provide a glossy surface finish is selected. It is determined that the printing process of ejecting the coating ink is to be executed last among all the printing processes. Then, the procedure advances to step S39.

Next, in step S39, it is determined whether or not to provide a matte surface finish by use of the coating ink. In the case where a matte surface finish is not to be provided (No in step S39), the procedure advances to step S47. By contrast, in the where a matte surface finish is to be provided (Yes in step S39), the procedure advances to step S40. In step S40, it is determined whether or not to use the white ink and the process color ink for the printing. In the case where the white ink and the process color ink are to be used (Yes in step S40), the procedure advances to step S41. In step S41, a printing mode (Mcoat) of ejecting only the coating ink in one printing process to provide a matte surface finish is selected. It is determined that the printing process of ejecting the coating ink is to be executed last among all the printing processes. Then, the procedure advances to step S47. By contrast, in the case where the white ink and/or the process color ink is not to be used (No in step S40), the procedure advances to step S42.

Next, in step S42, it is determined whether or not to use the process color ink for the printing. In the case where the process color ink is to be used (Yes in step S42), the procedure advances to step S43. In step S43, a printing mode (CMYK-Mcoat) of ejecting the process color ink and the coating ink in this order in one printing process is selected. It is determined that the printing process of ejecting the coating ink is to be executed last among all the printing processes. Then, the procedure advances to step S47. By contrast, in the case where the process color ink is not to be used (No in step S42), the procedure advances to step S44.

Next, in step S44, it is determined whether or not to use the white ink for the printing. In the case where the white ink is to be used (Yes in step S44), the procedure advances to step S45. In step S45, a printing mode (Wh-Mcoat) of ejecting the white ink and the coating ink in this order in one printing process is selected. It is determined that the printing process of ejecting the coating ink is to be executed last among all the printing processes. Then, the procedure advances to step S47. By contrast, in the case where the white ink is not to be used (No in step S44), the procedure advances to step S46. In step S46, a printing mode (Mcoat) of ejecting only the coating ink in one printing process to provide a matte surface finish is selected. It is determined that the printing process of ejecting the coating ink is to be executed last among all the printing processes. Then, the procedure advances to step S47.

In step S47, a printing pattern is set based on steps S31 through S46 described above. Specifically, first, the types of ink determined in step S2, and the types of ink to be used in the printing modes selected in steps S31 through S46, are compared against each other. In the case where the types of ink determined in step S2 include any type of ink that is not to be used in the printing modes selected in steps S31 through S46, a printing mode(s) of ejecting only such a type of ink is selected. Next, the selected printing modes are arranged in the order of execution to create a printing pattern. As described above, according to the procedure in this preferred embodiment, the printing modes each to be executed as one printing process and the order of execution of one or at least two such printing processes are automatically determined, and thus a printing pattern is set. The set printing pattern is stored on the model storage 56 while being linked with the work file provisionally stored on the model storage 56.

Next, in step S4, the printing cost calculator 54*c* calculates the printing cost based on, for example, the information on the types of ink to be used determined in step S2 and the printing pattern set in step S3. The printing cost may be a specific monetary value or may be a relative value on the basis of the printing cost of a certain product model. In one preferred embodiment, the printing cost calculator 54*c* calculates the printing cost based on the number of printing processes to be performed in the printing pattern that is set in step S3. For example, the printing cost of a product model in which the number of printing processes is n is set as reference. The printing cost calculator 54*c* performs the calculation such that the printing cost of a product model in which the number of printing processes is smaller than n is lower than the reference, and such that the printing cost of a product model in which the number of printing processes is larger than n is higher than the reference.

In another preferred embodiment, the printing cost calculator 54*c* calculates the printing cost based on the amount or the unit price of the special color ink to be used for the printing. For example, the printing cost of the high quality type printing using the white ink is calculated as a sum of the printing cost of the standard type printing not using the white ink and a monetary value corresponding to the unit price of the white ink. For example, the printing cost of the high quality type printing using the coating ink is calculated as a sum of the printing cost of the standard type printing not using the coating ink and a monetary value corresponding to the unit price of the coating ink. The calculated printing cost is stored on the model storage 56 while being linked with the work file provisionally stored on the model storage 56.

Next, in step S5, the printing time calculator 54*d* calculates an approximate printing time based on, for example, the printing pattern that is set in step S3. The printing time may be a specific time (hours, minutes) required for the printing, or may be a relative value on the basis of a time required to perform printing of a certain product model. More simply, the printing time may be the number of the printing processes. The calculated printing time is stored on the model storage 56 while being linked with the work file provisionally stored on the model storage 56.

In the above-described manner, a product model is created by the model creator 54. The product model includes, for example, the information input to the input 52, information on the types of ink to be used, information on the quality type, information on the printing pattern, information on the printing cost, information on the printing time, and the like. The product model includes such different types of information linked with each other as one group. The created product model is provided with an appropriate name (file name) so as to be distinguishable by the user, and is registered and stored on the model storage 56 as one file.

The model storage 56 has a plurality of product models stored thereon. FIG. 10 shows an example of product models (files 1 through 5). In this preferred embodiment, information included in the product models is represented in a table so as to be visually easy to understand. It should be noted that actual product models are created by, for example, source codes described in a programming language. In this case, a product model created by source codes is a text data file.

The product models shown in FIG. 10 each include (1) information on the printing target 70, (2) printing setting information, (3) information on the printing cost and (4) information on the palette 80, which are grouped into one file. In this preferred embodiment, the (1) information on the printing target 70 includes information on the name, external appearance (material, glossiness of the surface, color), and size (base size and round size) of the printing target 70. The (2) printing setting information includes information required by the controller 30 of the printer 10 to perform printing. In this preferred embodiment, the (2) printing setting information includes information on the printing quality, the types of special color ink to be used for the printing, the surface on which the printing is to be performed, the printing region (printing size and offset), the printing pattern, and the printing time (number of printing processes). In this preferred embodiment, the (4) information on the palette 80 includes information on one or a plurality of palettes 80 that are usable. Files 1 through 5 each include information on a plurality of palettes 80 linked for one product model. The plurality of palettes 80 is different from each other in the number and/or locations of the location holes 80h. One of the plurality of palettes 80 is set as a default palette having the highest priority. A product model is set to use the default palette 80 unless otherwise instructed specifically by the user.

Figure 11:
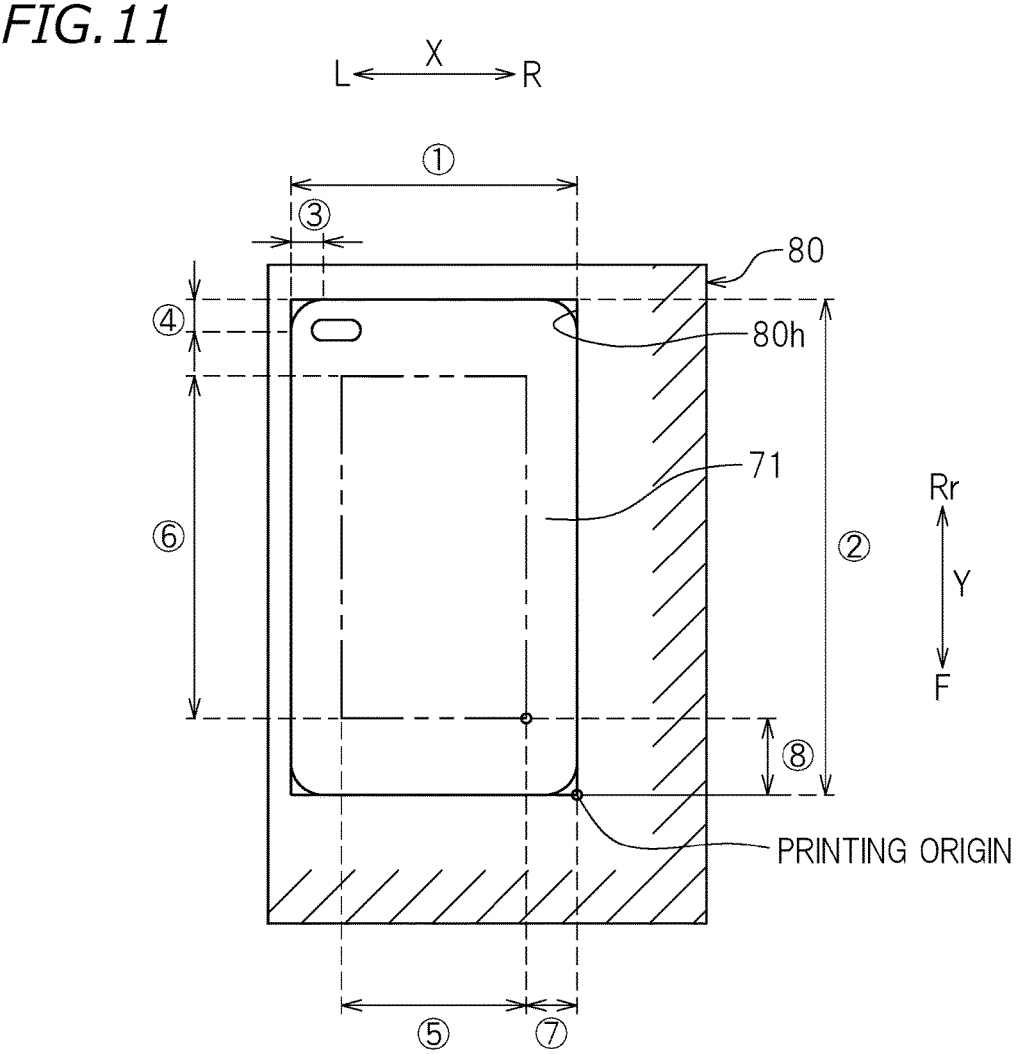
FIG. 11 is a partial enlarged view of FIG. 5.

In FIG. 10, the numerical figures shown in the "size" of the (1) information on the printing target 70, and the numerical figures shown in the "printing region" of the (2) printing setting information, correspond to those in FIG. 11. FIG. 11 is a partial enlarged view of the printing target 71 shown in FIG. 5. More specifically, the "Base Size" is the size of the external shape of the printing target 71. The "Round Size" is the roundness of each of corners of the printing target 71. The "Print Size" is the size of the region of the printing target 71 on which the printing is to be performed. The "Offset" is the distance from the printing origin to the printing start point (typically, the point, in the print size, closest to the printing origin).

The model storage 56 has stored thereon a plurality of product models including information on printing targets 70 different from each other in, for example, the shape, the external appearance or the like. In one preferred embodiment, the model storage 56 has stored thereon a plurality of variation product models including information on the same printing target 70 with different types of special color ink to be used for the printing. For example, a plurality of product models different in the setting on whether the white ink is to be used or not, or on whether the coating ink is to be used or not, are stored. A difference in the type of ink to be used changes at least one of the printing quality, the printing cost and the printing time. A plurality of product models may be provided on one, same printing target 70 with a difference in at least one of the printing quality, the printing cost and the printing time, so that different product models may be used in accordance with the needs of the user, such that, for example, the quality is to be prioritized, the cost is to be prioritized, or the efficiency is to be prioritized.

The product models to be stored on the model storage 56 may be created by the user by use of the model creator 54 as described above, may be acquired from a network connected with the printing information management device 50 in a wired or wireless manner, or may be pre-installed at the time of shipment of the printing information management device 50. The user may use a file of a product model created or acquired in the past and change a part of the information to create a new product model. The model storage 56 may be provided in, for example, a data server or the like placed on a network data-communicable with the printing information management device 50.

The display 58 displays one or at least two product models stored on the model storage 56. The display 58 includes, for example, one or at least two display portions. The display 58 may be configured or programmed to, for example, when information or the like on the printing target 70 is input to the model selector 60 by the user, display a product model including such information. In other words, the display 58 may be configured or programmed to display only the product models that may be selected by the user. The display 58 may define and function also as an input device of the model selector 60. The display 58 may be a touch panel operable by the user by a direct touch, for example.

The model selector 60 is used to make a printing setting on the printer 10. The model selector 60 is configured or programmed to select a product model when, for example, being operated by the user. The model selector 60 typically includes an input device (not shown) such as a keyboard, a mouse, a button or the like, like the input 52, and allows the user to manually input information thereto. For example, the user operates the button of the input device to transmit a signal to the model selector 60. Upon receipt of the signal, the model selector 60 selects a product model. The product model selected by the model selector 60 is transmitted to the output 62.

The user may refer to the display 58 to select a product model. For example, the user may refer to the display 58 to select the product models matching certain conditions step by step from the plurality of product models, and finally select one product model. One specific example is as follows. First, the user selects the type of the printing target 70 by the model selector 60. As a result, the display 58 displays a plurality of variation product models including information on one, same printing target 70 with a difference in at least one of the printing quality, the printing cost and the printing time. Next, the user compares the variation product models provided laterally, and selects one desired product model in accordance with his/her needs from the compared product models. In the case of, for example, prioritizing the quality, the user may select a high quality type product model. In the case of, for example, prioritizing the printing cost, the user may select a product model with a small value of the printing cost. In the case of, for example, prioritizing the printing efficiency, the user may select a product model with a small value of the printing time.

The output 62 transmits the printing setting information included in the product model selected by use of the model selector 60 to the controller 30 of the printer 10. Based on the received printing setting information, the controller 30 of the printer 10 controls the ink heads 23, the table 25 and the like on the basis of the printing origin, and performs the printing on the printing target 70.

As described above, the printing information management device 50 in this preferred embodiment has stored thereon a plurality of product models in which printing information necessary for the printing is preset. Therefore, the user merely needs to select a product model in accordance with the type of the printing target 70 or the like to automatically make a printing setting necessary for the printing. In other words, the user does not need to manually input the printing setting. This significantly decreases the load required for the user. Even a user having little knowledge or experience in printing may make a printing setting easily and quickly. In addition, as compared with the case where the printing setting is manually input, the printing fails less and a desired printed item is stably provided.

The printing information management device 50 according to this preferred embodiment is preferably usable when a user not accustomed to use the printer 10 to make a printing setting. It is possible that a standalone KIOSK printer that is installed in a retailer such as, for example, a mobile phone store, a store of an electric and electronics home appliances chain, a photo developer, a store in a shopping mall or the like is operated by a store clerk who is not specialized in printing in response to an order from a customer, or is operated by a customer. The printing information management device 50 may be preferably used in combination with such a KIOSK printer. The printing system 100 including the printing information management device 50 is preferably usable to provide additional values to products; for example, is usable to perform printing on a mobile phone case in a mobile phone store or to perform printing on an electronic cigarette in a store of an electric and electronics home appliances chain.

In this preferred embodiment, the printing setting information includes size information on the printing region of the printing target 70, position information on the printing start point in the printing target 70 that is defined on the basis of the printing origin, and a printing pattern including one or at least two printing processes, each including a repetition of ejection of the ink from each of the ink heads 23 and movement of the table 25 in the scanning direction with respect to the ink heads 23, arranged in the order of execution.

In this preferred embodiment, the printing setting information includes information on the printing quality. The model storage 56 has stored thereon a plurality of product models including the same information on the printing target 70 and different information on the printing quality from each other. In this preferred embodiment, the product model further includes information on the printing cost that is linked with the information on the printing target 70 and the printing setting information. The model storage 56 has stored thereon a plurality of product models including the same information on the printing target 70 and different information on the printing cost from each other. With such a structure, the user may use different product models in accordance with his/her needs such that, for example, the quality is to be prioritized, the cost is to be prioritized, or the efficiency is to be prioritized. Even a user having no knowledge of ink may select one product model from a plurality of product models intuitively and quickly.

In this preferred embodiment, the printing information management device 50 includes the display 58 to display the product models stored on the model storage 56. The display 58 laterally displays a plurality of product models including the same information on the printing target 70 and different information, from each other, on at least one of the other types of information. This allows the user to easily compare the product models to select a desired product model, and thus improves the convenience for the user.

In this preferred embodiment, the printing target 70 includes the front surface and the rear surface. The printing information management device 50 includes the input 52, to which the type of ink, among the plurality of types of ink, to be used to perform the printing on the printing target 70, and information on the surface of the printing target 70 on which the printing is to be performed, are to be input, and also includes the model creator 54 configured or programmed to allow the user to create the product model. The model creator 54 includes the printing pattern setter 54b configured or programmed to set, based on the information input to the information portion 52, a printing pattern including one or at least two printing processes, each including a repetition of ejection of the ink from each of the ink heads 23 and movement of the table 25 in the scanning direction with respect to the ink heads 23, arranged in the order of execution. With such a structure, the user may create and use an original product model, in addition to using a product model pre-installed at the time of shipment or a product model acquired from a network connected with the printing information management device 50 in a wired or wireless manner. Therefore, a wider variety of original product models may be created, and the user selects a product model from a larger number of product models.

In this preferred embodiment, the model creator 54 further includes the printing cost calculator 54c configured or programmed to calculate the printing cost based on the printing pattern that is set by the printing pattern setter 54b. With such a structure, the user may use the printing cost as a criterion to select a product model. The user may grasp the printing cost (actual cost) before performing the printing.

In this preferred embodiment, the recording device is a KIOSK printer. It is possible that such a KIOSK printer is used by a user not accustomed to use the printer 10 to make a printing setting. Therefore, it is desirable to use the printing information management device 50 disclosed herein together with the recording device.

The printing information management device 50 and the printing system 100 including the same in this preferred embodiment are described above. The printing information management device and the printing system including the same are not limited to the above.

For example, in the preferred embodiment shown in FIG. 6, the printing information management device 50 includes the input 52, the model creator 54, the model storage 56, the display 58, the model selector 60 and the output 62. The printing information management device 50 is not limited to this. For example, in the case where product models are pre-installed on the model storage 56 at the time of shipment of the printing information management device 50, or in the case where the user may access a website prepared by a manufacturer and download a product model uploaded on the website, the input 52 and the model creator 54 are not necessary and may be omitted. In the preferred embodiment shown in FIG. 6, the model creator 54 includes the ink setter 54a, the printing pattern setter 54b, the printing cost calculator 54c and the printing time calculator 54d. The model creator 54 is not limited to this. For example, the printing cost calculator 54c and/or the printing time calculator 54d is not always necessary and may be omitted.

There is no specific limitation on the structure of the printer 10. For example, the printer 10 described in the above-described preferred embodiments is a so-called shuttle (serial) printer, in which the ink heads 23 are included in the carriage 19, and printing is performed while the carriage 19 is reciprocatingly moved in the left-right direction X (shuttle movement). The printer is not limited to this. The technology disclosed herein is also applicable to, for example, a line printer, which includes line heads having the same width as that of a storage medium and performs printing while the line heads are set in a fixed position. In the above-described preferred embodiments, the carriage 19 of the printer 10 is moved in the left-right direction X, whereas the table 25 is moved in the front-rear direction Y. The printer 10 is not limited to this. The movement of the carriage 19 and the table 25 are relative to each other, and either one of the carriage 19 and the table 25 may move in the left-right direction X or in the front-rear direction Y. Alternatively, for example, the carriage 19 may be unmovable, and the table 25 may be moved both in the left-right direction X and in the front-rear direction Y.

In the above-described preferred embodiments, the printer 10 includes the ultraviolet lamps 24. The ultraviolet lamps 24 are not indispensable and may be omitted. In this case, the ink cartridges 21 and 22 may each store ink other than the ultraviolet-curable ink. The printer 10 may include a cutting head that cuts the printing target 70.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printing information management device managing a product model usable for a recording device including ink heads that eject a plurality of types of ink, a support that supports a printing target, and a conveyor that moves the support in a scanning direction with respect to the ink heads, the printing information management device comprising:
   a model storage that stores a plurality of product models each included in one file in a state of being linked with information on the printing target, information on a palette placed on the support that accommodates the printing target during printing, and printing setting information used to control the recording device;
   a model selector that selects one product model from the plurality of product models; and
   an output that provides the printing setting information included in the selected product model to the recording device, wherein
   the ink heads include a first ink head that ejects ink used for image formation and a second ink head that ejects ink used for at least one of under treatment before the image formation and surface finish after the image formation, and
   the model storage stores the plurality of product models including the same information on the printing target and different information for the printing setting information to eject ink from the second ink head.

2. The printing information management device according to claim 1, wherein the printing setting information includes:
   size information on a printing region of the printing target;
   position information on a printing start point in the printing target that is defined based on a printing origin; and
   a printing pattern including one or at least two printing processes, each including a repetition of ejection of the ink from each of the ink heads and movement of the support in the scanning direction with respect to the ink heads, arranged in order of execution.

3. The printing information management device according to claim 1, wherein
   the printing setting information includes information on a printing quality; and
   the model storage stores a plurality of product models including the same information on the printing target and different information on the printing quality from each other.

4. The printing information management device according to claim 1, wherein
   the product models each further include information on a printing cost linked with the information on the printing target and the printing setting information; and
   the model storage stores a plurality of product models including the same information on the printing target and different information on the printing cost from each other.

5. The printing information management device according to claim 1, further comprising a display that displays the product models stored on the model storage; wherein
   the display laterally displays a plurality of product models including the same information on the printing target and different information, from each other, on at least one of types of information other than the information on the printing target.

6. The printing information management device according to claim 1, wherein
   the printing target includes a front surface and a rear surface;
   the printing information management device further includes:
   an input to which the type of ink, among the plurality of types of ink, to be used to perform printing on the printing target, and information on the surface of the printing target on which the printing is to be performed, are to be provided; and
   a model creator that allows a user to create a product model; and
   the model creator includes a printing pattern setter that sets, based on the information input to the information portion, a printing pattern including one or at least two printing processes, each including a repetition of ejection of the ink from each of the ink heads and movement of the support in the scanning direction with respect to the ink heads, arranged in order of execution.

7. The printing information management device according to claim 6, wherein the model creator further includes a printing cost calculator that calculates a printing cost based on the printing pattern set by the printing pattern setter.

8. A printing system, comprising:
   the printing information management device according to claim 1; and
   a recording device communicably connected with the printing information management device.

9. The printing system according to claim 8, wherein the recording device is a KIOSK printer.

10. A non-transitory computer-readable storage medium storing a computer program that causes a computer to operate as the printing information management device according to claim 1.

11. The printing information management device according to claim 1, wherein the model storage stores the plurality of product models including different information on at least one of (1) to (4):
    (1) using an ink for the under treatment or not;
    (2) using an ink for the surface finish or not;
    (3) providing a glossy surface finish using an ink for the surface finish or not; and (4) providing a matte surface finish using an ink for the surface finish or not.

12. The printing information management device according to claim 1, wherein the model storage stores the plurality of product models including different information on using at least one of a primer ink, a white ink, and a coating ink.

13. The printing information management device according to claim 1, wherein the one product model selected by the model selector includes information on a plurality of palettes in the one product model.

14. The printing information management device according to claim 13, wherein one of the plurality of palettes is set as a default palette having a highest priority.

15. The printing information management device according to claim 1, wherein the palette accommodates a plurality of printing targets during printing.

16. A printing information management device managing a product model usable for a recording device including ink heads that eject a plurality of types of ink, a support that supports a printing target, and a conveyor that moves the support in a scanning direction with respect to the ink heads, the printing information management device comprising:
a model storage that stores a plurality of product models each included in one file in a state of being linked with information on the printing target, information on a palette placed on the support that accommodates the printing target during printing, and printing setting information used to control the recording device;
a model selector that selects one product model from the plurality of product models; and
an output that provides the printing setting information included in the selected product model to the recording device, wherein
the one product model selected by the model selector includes information on a plurality of palettes in the one product model.

17. The printing information management device according to claim 16, wherein one of the plurality of palettes is set as a default palette having a highest priority.

18. A printing information management device managing a product model usable for a recording device including ink heads that eject a plurality of types of ink, a support that supports a printing target, and a conveyor that moves the support in a scanning direction with respect to the ink heads, the printing information management device comprising:
a model storage that stores a plurality of product models each included in one file in a state of being linked with information on the printing target, information on a palette placed on the support that accommodates the printing target during printing, and printing setting information used to control the recording device;
a model selector that selects one product model from the plurality of product models; and
an output that provides the printing setting information included in the selected product model to the recording device, wherein
the palette accommodates a plurality of printing targets during printing.

* * * * *